United States Patent [19]

Bellamy

[11] 4,385,851
[45] May 31, 1983

[54] CLAMPING METHOD AND DEVICE

[75] Inventor: Roger Bellamy, Leicester, England

[73] Assignee: Camloc Industrial Fixings (UK) Limited, Leicester, England

[21] Appl. No.: 221,860

[22] Filed: Dec. 31, 1980

[51] Int. Cl.³ .............................................. F16B 13/00
[52] U.S. Cl. ................................ 403/406; 24/221 R; 292/59
[58] Field of Search ............ 24/221 R, 221 A, 221 K; 403/408, 406, 405; 292/59, 62

[56] References Cited

U.S. PATENT DOCUMENTS

| 948,119 | 2/1910 | Wettig | 24/221 K UX |
| 2,975,667 | 3/1961 | Bross | 24/221 K X |
| 3,898,716 | 8/1975 | Aylott | 24/221 K |

FOREIGN PATENT DOCUMENTS 398782 9/1933 United Kingdom .
1216011 12/1970 United Kingdom .

Primary Examiner—Andrew V. Kundrat
Attorney, Agent, or Firm—Flynn, Thiel, Boutell & Tanis

[57] ABSTRACT

A clamping device for clamping a panel to a supporting flange comprises a clamping element with a radial arm for engagement with the lower side of the flange. The clamping element is mounted on one end of a rotatable pin by means of a cross-pin passing through the rotatable pin and engaging grooves in the clamping element. The rotatable pin has a head with a slot for turning the pin. The head is mounted within a cup and biassed away from the base of the cup by a spring which holds the cross-pin in engagement with the clamping element. The cup fits in an aperture in the panel and has a flange at its open end which rests against the face of the panel. A washer fixed to the underside of the panel has a rib which engages locating recesses in the clamping element.

11 Claims, 2 Drawing Figures

CLAMPING METHOD AND DEVICE

FIELD OF THE INVENTION

The invention relates to a method and a device for holding two members together.

SUMMARY OF THE INVENTION

According to a first aspect of the invention ther is provided a method for holding two members together, comprising the steps of passing a pin into a hole in a first of the members adjacent the second member, securing a clamping element to the first member by mounting it on one end of the pin, the clamping element being urged towards the first member by a spring arranged on the pin, the clamping element and pin being rotatable as one unit relative to the first member between a clamping position in which an arm on the clamping element extending radially away from the pin engages the second member and a released position in which the arm does not engage the second member, at least one projection or recess being defined on the clamping element for engagement, when the clamping element is in the clamping position, with a recess or projection defined on the first member, there being provided means to enable a torque to be applied to the pin and means to enable determination of the orientation of the pin relative to the first member, whereby a user can determine by inspection of the pin whether the clamping element is in the clamping position.

Further aspects of the invention provide a clamping device for holding two members together, and an assembly comprising two members and a clamping device.

BRIEF DESCRIPTION OF THE DRAWINGS

The invention will be further described by way of example with reference to the accompanying drawings, in which.

DETAILED DESCRIPTION

Figure 1:
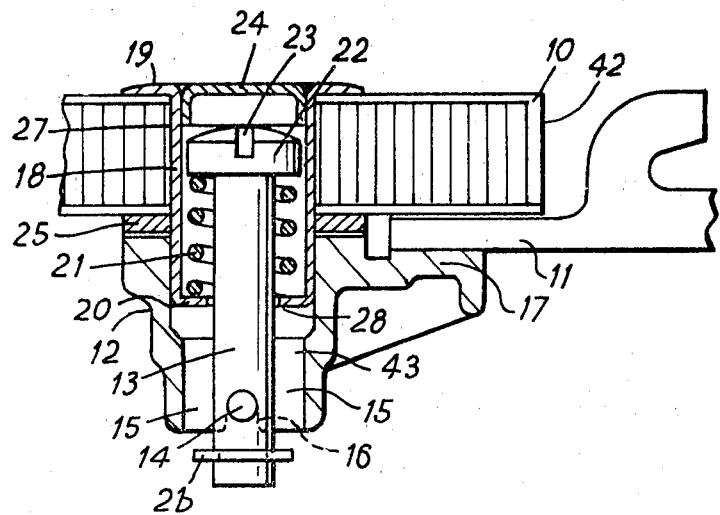
FIG. 1 is a section through a clamping device constructed according to the invention.

Referring to the drawings, a clamping device for clamping together two overlapping members 10 and 11 is shown. The two members could, for example, be a floor panel 10 and a supporting structure 11. The clamping device comprises a cup 18 mounted in a hole 27 in the member 10, the cup having a flange 19 which engages the face of the member 10 remote from the member 11, i.e. the upper face. The cup 18 has a base 20 against which bears the lower end of a spring 21. Passing through the spring 21 and through a hole 28 in the base 20 of the cup 18 is a pin 13, the upper end of the spring 21 bearing against the head 22 of the pin 13.

A cross-pin 14 is fixed in a transverse bore near the lower end of the pin 13, and engages the ends of a pair of grooves 16 in a bore 43 through a clamping element 12 mounted on the pin 13. The lower portion of the bore 43 is a close fit on the pin 13. The engagement between the cross-pin 14 and the ends of the grooves 16 and the action of the spring 21, results in the clamping element 12 being urged upwardly towards the member 10. Consequently, an arm 17 on the clamping element which extends radially away from the pin 13 engages the lower face of the member 11.

A washer 25 is fixed, preferably by use of an adhesive, to the lower face of the member 10. The washer 25 has a downwardly directed rib in two portions 29 and 30 arranged at diametrically opposite positions with respect to the hole in the washer, which is arranged to co-incide with the hole 27 in the member 10.

The engagement between the cross-pin 14 and the grooves 16 in the bore 43 of the clamping element 12 constrains the clamping element against rotation relative to the pin 13. The pin 13 and clamping element 12 can be rotated as one unit about the longitudinal axis of the pin between a clamping position (shown in FIG. 1) and a released position in which the arm 17 does not engage the member 11. A slot 23 is provided in the head 22 of the pin 13 to enable rotation of the pin and clamping element by application of a torque to the head of the pin e.g. by means of a screw-driver. In both the clamping position and the released position the portions 29 and 30 of the rib on the washer 25 engage recesses 31 to 34 in the face of the clamping element 12 adjacent the member 10.

Figure 2:
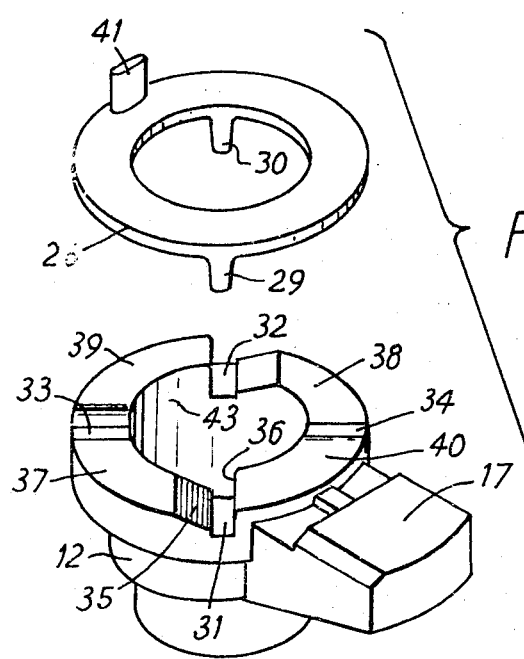
FIG. 2 is a perspective view of two elements of the clamping device shown in FIG. 1, the elements being shown spaced apart for clarity.

Referring to FIG. 2, the clamping element 12 is shown in the orientation relative to the washer 25 which it occupies when in the clamping position shown in FIG. 1.

The portions 29 and 30 of the rib on the washer 25 are received in a pair of recesses 31 and 32 respectively. When the clamping element 12 is in the released position the portions 29 and 30 of the rib are received in a second pair of recesses 33 and 34 respectively. Each recess 31 to 34 has one gradual slope 35 (see recess 31) and one steep slope 36. The slopes of the recesses are so arranged as to limit the rotation of the clamping element relative to the washer 25 to the angular separation between adjacent recesses. When the clamping element is in the clamping position the steep slopes of the recesses 31 and 32 prevent rotation of the clamping element in one direction. Rotation of the clamping element in the opposite direction results in the portions 29 and 30 of the rib on the washer 25 moving along the gradual slopes out of the recesses 31 and 32 and eventually into recesses 33 and 34, again along the gradual slopes.

When the portions 29 and 30 of the rib are in the recesses 33 and 34, further rotation is prevented by engagement with the steep slopes of those recesses and the clamping element can only be returned to the clamping position by rotation in the opposite direction.

The recesses 33 and 34, which are engaged by the portions 29 and 30 of the rib on the washer 25 when the clamping element is in the released position, are not as deep as the recesses 31 and 32. Consequently, the clamping element may be closer to the member 10 in the clamping position than in the released position, unless the engagement of the arm 17 by the member 11 prevents the clamping element approaching the first member to the extent allowed by the relative dimensions of the recesses 31 and 32 and the portions 29 and 30 of the rib.

The regions 37 and 38 of the upper face of the clamping element which are traversed by the portions 29 and 30 of the rib as the clamping element is rotated between the clamping and released positions are a smaller height above the bases of the recesses 31 and 32 than are the remaining regions 39 and 40 of the upper face.

It will be seen from FIG. 2 that the four recesses 31 and 34 on the clamping element are spaced apart at angular separations of approximately 90°, where the angular separations are determined with regard to the centres of the bases of the recesses. The recesses are in two pairs; the pair 31 and 32 receiving the rib on the washer in the clamping position and the pair 33 and 34 receiving the rib in the released position. One recess of each pair, i.e. recess 31 and recess 34, is spaced at an angular separation of approximately 45° from the arm 17 on the clamping element.

The method of assembly of the clamping device is as follows.

The hole 27 is prepared in the member 10 adjacent the region of overlap with the member 11, the hole 27 being large enough to receive the cup 18. A second, smaller hole which need not pass completely through the member 10 is prepared from the under side of the member. The second hole receives a tab 41 on the washer 25 when this is bonded to the lower surface of the member 10, and thus assists in preventing rotation of the washer 25 relative to the member 10. As shown in FIG. 2, the tab 41 is preferably on the side of the washer 25 remote from the arm on the clamping element when the clamping element is in the clamping position relative to the washer 25. Since the clamping devices will often be in use near an edge 42 of the member 10, this location of the tab 41 will generally result in the second hole being further from the edge 42 than is the hole 27.

The pin 13 is passed through the spring 21 and the cup 18, and the cross-pin 14 is then fixed in the transverse bore through the pin, preferably by swaging.

When the washer 25 has been fixed to the member 10 the combination of pin 13, spring 21, cup 18, and cross-pin 14 is fed into the hole 27 from the upper side, i.e. from the side remote from the member 11, until the flange 19 of the cup is in contact with the upper face of the member 10.

Pressure is applied to the head 22 of the pin 13 and the clamping element 12 is offered to the end of the pin 13 in the orientation shown in FIG. 1, but with the pin 13 displaced through 90° relative to the clamping element 12 so that the ends of the cross-pin 14 can pass through a first pair of grooves 15 defined in the bore through the clamping element. When the cross-pin 14 emerges from the lower end of the clamping element, the pin is rotated through 90° relative to the clamping element. The pressure on the pin 13 is released, and the pin 13 is retracted through the bore in the clamping element, under the action of the spring 21, the ends of the cross pin 14 being received in a second pair of grooves 16 defined in the bore of the clamping element. The grooves 16, unlike the grooves 15, terminate part of the way along the bore and so the cross-pin 14 eventually engages abutment faces at the ends of the grooves 16. When the ends of the cross-pin 14 are in engagement with the ends of the grooves 16, the spring 21 acts to urge the clamping element 12 towards the member 10.

The engagement between the cross-pin 14 and the grooves 16 constrains the clamping element against rotation relative to the pin 13. Consequently, a screwdriver can be used to engage the slot 23 in the head of the pin 13, to apply pressure to the head of the pin, and to rotate the clamping element between the clamping position shown in FIG. 1 in which the arm 17 engages the member 11 and the released position in which the arm 17 does not engage the member 11. The interaction in the two positions of the recesses 31 to 34 and the portions 29 and 30 of the rib on the washer 25 has been described above. The orientation of the slot 23 in the pin 13 relative to the member 10, e.g. by reference to the edge 42 of the member, can serve as an indication of whether the clamping element is in the clamping or the released position.

The spring 21 always acts to urge the clamping element towards the member 10 but also allows for accommodation of slight variations in the relative dimensions of various parts of the assembly. It will be seen from FIG. 1 that the clamping device need not project very far above the upper face of the member 10, and a plug 24 can be fitted into the open end of the cup 18. When the clamping device has been assembled, a retaining washer 2b is fitted into an annular groove near the free end of the pin 13. The outer diameter of the retaining washer is larger than the diameter of the lower portion of the bore 43 through the clamping element. If the clamping element becomes detached from the cross-pin 14, the retaining washer 2b will prevent it becoming separated from the pin 13.

It will be appreciated that the invention is not limited to the one embodiment described and shown in the drawings. For example, a washer 25 need not be employed if the portions 29 and 30 of the rib are defined directly on the member 10. It would be possible to define ribs or other projections on the clamping element 12 to be received in recesses defined on the member 10. The spring 21 could be arranged on the pin 13 below the clamping element 12. The clamping device is applicable not only to overlapping members.

I claim:

1. A device for clamping first and second members together, comprising a cup which has an open end, a base, an aperture in said base and an outwardly extending flange around said open end; a pin rotatably supported in said aperture; a washer surrounding said cup, the first member being receivable between said flange of said cup and said washer; a clamping element supported on said pin on the side of said base remote from said flange; a radially outwardly extending arm on said clamping element; means for preventing rotation of said clamping element relative to said pin, said clamping element and said arm thereon being rotatable with said pin between a clamping position in which said arm engages the second member and clamps it against the first member and a released position in which said arm is free of engagement with the second member; a spring arranged to bias said pin and said clamping element in a direction toward said open end of said cup; and rib means on one of said washer and clamping element and recess means on the other of said washer and clamping element, said rib means being cooperable with said recess means in said clamping position for resisting relative rotation of said washer and clamping element.

2. The clamping device according to claim 1, wherein said rib means is on said washer and includes two ribs which are diametrically opposed with respect to the center of said washer; wherein said recess means is on said clamping element and includes a pair of first recesses provided in a surface of said clamping element and diametrically opposed with respect to the center of said clamping element; and wherein said recess means includes a pair of second recesses in said surface of said clamping element which are diametrically opposed with respect to the center thereof, are angularly spaced from said first recesses, and engage said ribs in said released position.

3. The clamping device according to claim 2, wherein said first recesses are deeper than said second recesses.

4. The clamping device according to claim 2, wherein one said recess of each of said pairs of recesses on said clamping element is angularly spaced approximately 45° from said arm of said clamping element.

5. The clamping device according to claim 2, wherein a gradual slope is provided at one side of each said recess and a steep slope is provided at the other side, said ribs on said washer entering and leaving said recesses by sliding on said gradual slopes, said gradual slopes of said recesses being arranged to permit rotation of said clamping element from said clamping position to said released position only in one direction and rotation from said released position to said clamping position only in the opposite direction.

6. The clamping device according to claim 5, wherein the regions of said surface of said clamping element which said ribs on said washer slide on as said clamping element is rotated between said clamping position and said released position are spaced a smaller distance from the bases of said pair of first recesses than the remaining regions of said surface of said clamping element.

7. The clamping device according to claim 1, wherein a head is disposed at an end of said pin on the side of said base remote from said clamping element, said spring engaging said base of said cup and said head of said pin.

8. The clamping device according to claim 1, including a transverse first bore provided through said pin, a cross-pin received in said first bore and having ends projecting outwardly from said pin, a second bore provided in said clamping element, said pin being received in said second bore; a pair of axial first grooves in said second bore of sufficient size to permit said cross-pin to pass through said clamping element therein, a pair of second grooves in said second bore which are angularly spaced from said first grooves; and abutment faces provided in said second grooves to engage said ends of said cross-pin to prevent said pin from being retracted through said second bore.

9. The clamping device according to claim 1, wherein a slot is provided in an end of said pin which is on the side of said base remote from said clamping element, and including a plug received in said open end of said cup.

10. The clamping device according to claim 1, including an annular groove in said pin on the side of said clamping element remote from said cup and a retaining washer received in said annular groove to prevent said clamping element from being separated from said pin.

11. The clamping device according to claim 1, including a tab provided on the opposite side of said washer from the side thereof having one of said recess means and rib means thereon, said tab being receivable in a hole provided in the first member.

* * * * *